C. BLAGBURN.
PROCESS FOR PRESERVING AND TRANSPORTING FRUIT AND OTHER EDIBLES.
APPLICATION FILED MAR. 18, 1911.
1,128,936.
Patented Feb. 16, 1915.
3 SHEETS—SHEET 2.
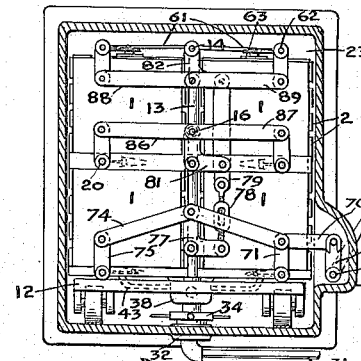
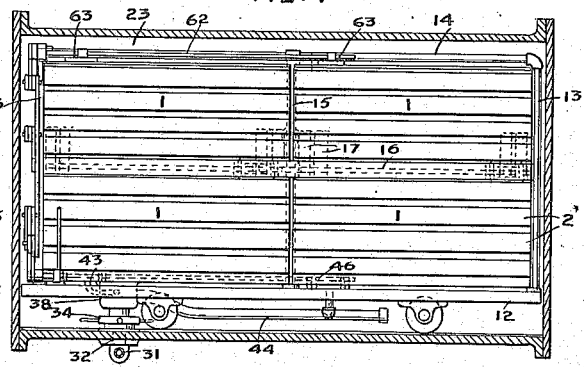
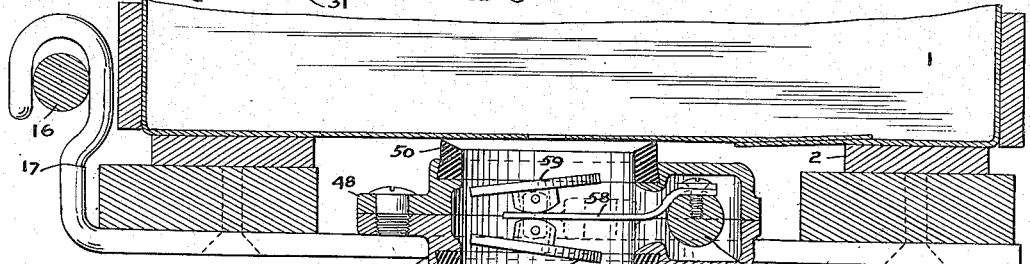
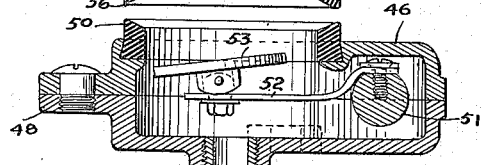
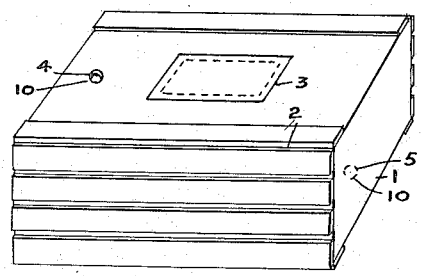
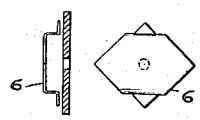
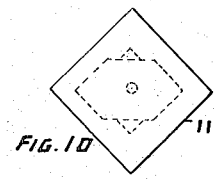
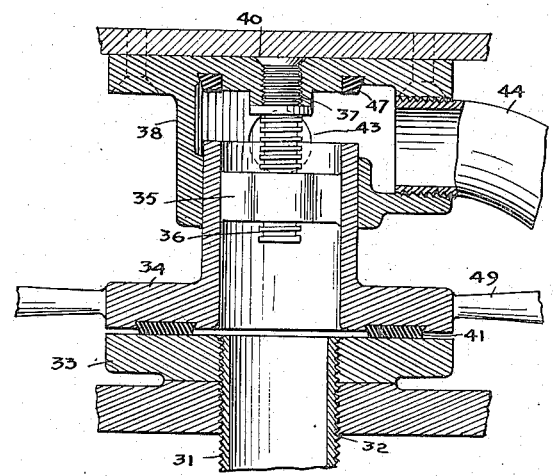
WITNESSES
N. B. Keating
H. L. Roderick
INVENTOR:
Chas. Blagburn
By F. M. Wright
Attorney

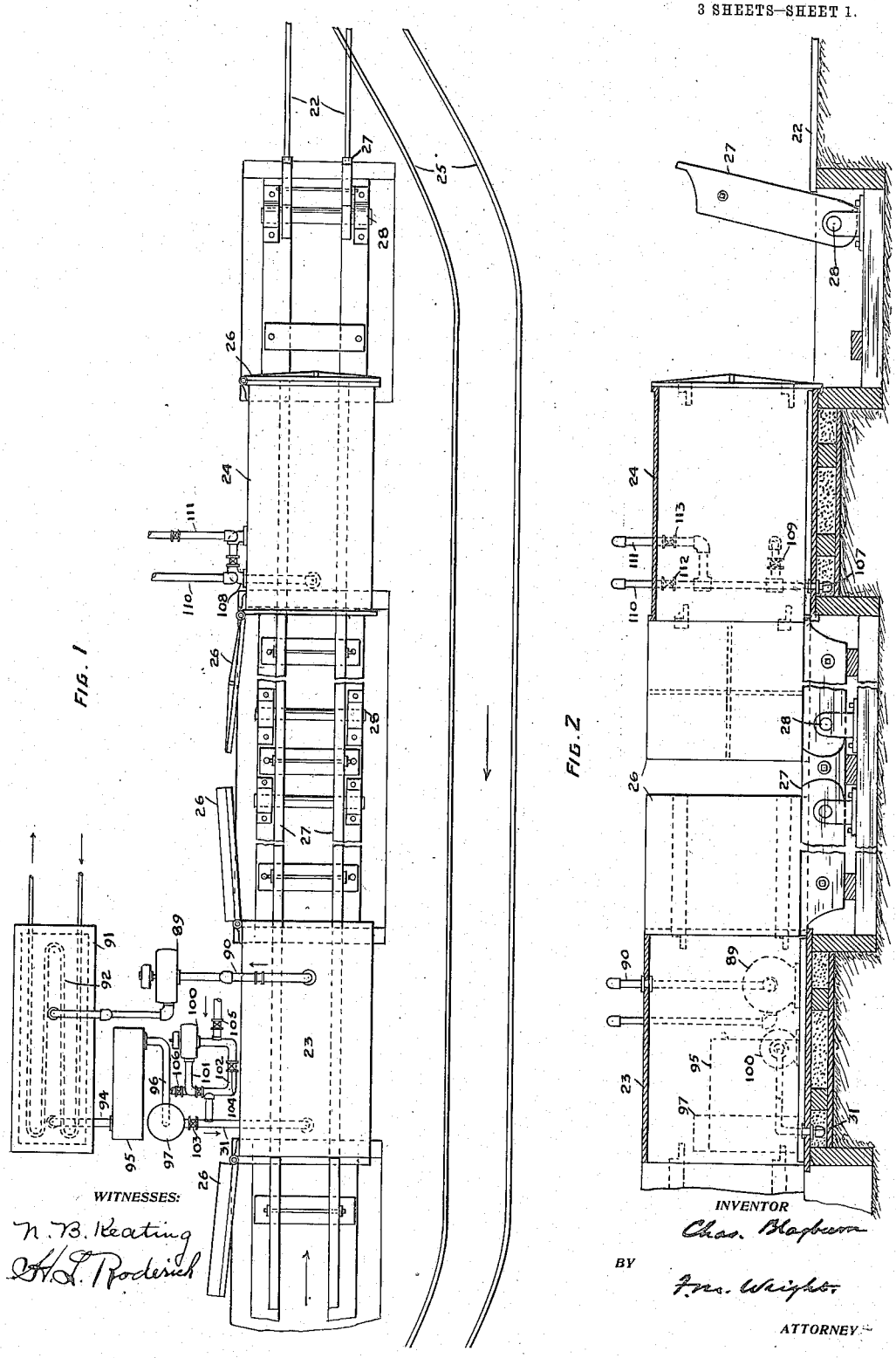

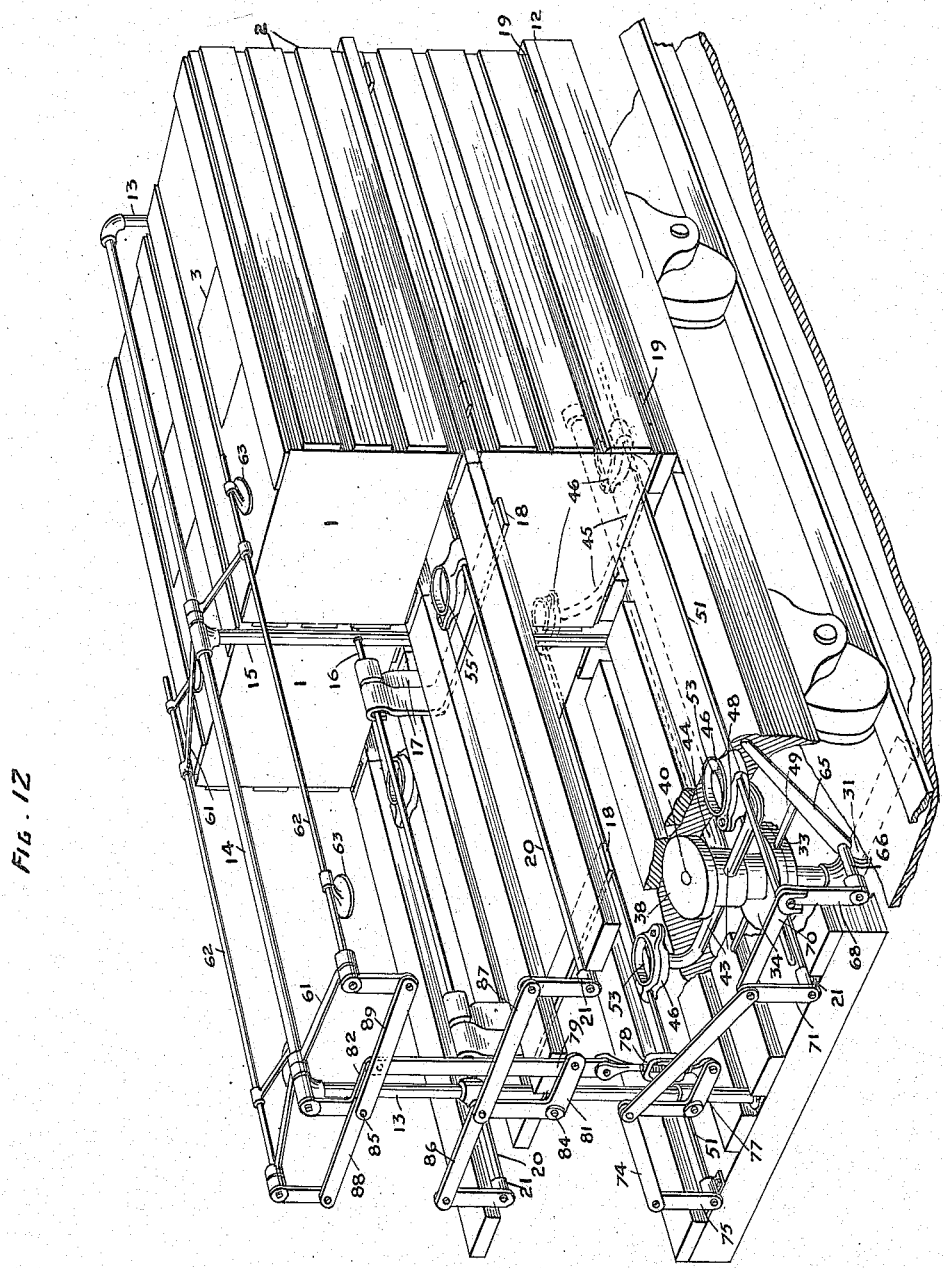

UNITED STATES PATENT OFFICE.

CHARLES BLAGBURN, OF SAN FRANCISCO, CALIFORNIA.

PROCESS FOR PRESERVING AND TRANSPORTING FRUIT AND OTHER EDIBLES.

1,128,936. Specification of Letters Patent. Patented Feb. 16, 1915.

Application filed March 18, 1911. Serial No. 615,276.

*To all whom it may concern:*

Be it known that I, CHARLES BLAGBURN, a citizen of the United States, residing at San Francisco, in the county of San Francisco and State of California, have invented new and useful Improvements in Processes for Preserving and Transporting Fruit and other Edibles, of which the following is a specification.
The present invention relates to a method of filling air-tight boxes containing fruit or other perishable materials with a preserving gas such as nitrogen. The object of the invention is to provide a method by which the boxes may be completely filled with the nitrogen gas exclusively and all other gases eliminated therefrom, and a further object is to provide such a method by which a large number of boxes can be so filled in a comparatively short time.

My improved method consists in, first, inclosing the perishable material in a receptacle adapted to be rendered air-tight, then passing cold sterilized dry air through the receptacle, causing it to enter and leave said receptacle by two openings oppositely located in its wall, then introducing a disinfectant gas into the receptacle, then connecting the receptacle with a vacuum chamber to produce a vacuum therein, then connecting the receptacle with a supply of preserving gas to fill said receptacle with said gas, and then sealing the receptacle against the entrance of air.
In the accompanying drawings, Figure 1 is a plan view of an apparatus used for carrying out my improved process; Fig. 2 is a longitudinal section thereof, certain parts being shown in side elevation; Fig. 3 is an end view of the vacuum chamber with a truck therein, the end being removed; Fig. 4 is a side view of the vacuum chamber with a truck therein, the end being removed; Fig. 4 is a side view of the vacuum chamber, a side being removed; Fig. 5 is a broken transverse sectional view of a box used in my improved process, showing also a spacing shelf and an intermediate closer casing; Fig. 6 is a sectional view of a lower closer casing; Fig. 7 is a perspective view of a packing box used in my improved process; Fig. 8 is a sectional view of a valve; Fig. 9 is a plan view of the same; Fig. 10 is a plan view of the valve cover; Fig. 11 is an enlarged sectional view of a coupling and parts connected therewith; Fig. 12 is a perspective view of a truck.

In practising my invention I employ a box 1, shown more particularly in Fig. 7, constructed of air-tight material and suitably strengthened by wooden slats 2. Said box is provided with a filling opening 3, and with upper and lower gas vents 4, 5, by which the box is exhausted of air, and, by vacuum and displacement, filled with preserving gas. Each vent is furnished with a suitable valve 6 shown more particularly in Figs. 8 and 9, made of paper, and secured to the box at two points 10 thereof, which valve, when the box is filled with preserving gas, is secured tight upon the box by means of a slow setting cement previously applied thereto, so that the valve is caused to adhere closely to the box by pressure applied to said valve as hereinafter described. After the final closure of the valve it is covered with a cover 11, shown more particularly in Fig. 10, secured by a quick setting cement. The upper and lower gas vents are preferably at opposite ends of the top and bottom of the box.

The boxes having been previously filled and the filling opening 3 closed, they are loaded on to trucks, shown at 12, each truck carrying eight or more boxes in tiers, there being four boxes in each tier. I have herein shown the boxes arranged in two tiers.

At the center of each end of the body of the truck is erected a standard 13, which standards are connected at the top by a longitudinal rod 14, the center of said rod being also supported from the body of the truck by a standard 15. Said standards 13 and 15 are connected at points intermediate of their height by a longitudinal rod 16. On said longitudinal rod are hooked angle brackets 17, to which are secured slats 18 forming separating shelves, which shelves are supported upon the boxes of the lower tier and in turn support the boxes of the upper tier. Similar slats 19 are fixedly secured on the bottom of the truck. Extending longitudinally between the slats on each side of the truck are rock shafts 20 rocking in bearings 21.

22 indicates rails, which extend in succession from a packing bench, not shown, through a cooling chamber 23, and a vacuum chamber 24. After passing through the vacuum chamber said rails are extended to a delivery bench, not shown, where the permanent closing of the boxes is completed ready for shipping in railroad cars, the trucks being then returned by side rails 25 to the packing bench. Each of said chambers 23 and 24 is closed at each end by a door 26 hinged at the side, and there are provided rails 27 adjacent to said ends, which are hinged as shown at 28 to permit them to swing out of the way and allow said doors to be opened or closed.

The inlet door of the cooling chamber having been opened, and the rails 27 lowered into register with the other rails 22, a truck 12, having thereon a plurality of boxes 1, filled with perishable articles, as fruit, is moved into said chamber 23. A pipe 31 extends beneath the cooling chamber, and passes upward, as shown at 32, through the bottom of one end of said cooling chamber, at the center thereof, and is connected at its upper end with a flange 33, (see Fig. 11). With the upper surface of said flange is adapted to register the lower surface of a flanged lower end of a coupling valve 34, having a bridge 35 which is screwed on to a screw 36, the upper end of which is formed with a small thread 37 by which it is screwed into the top of a valve box 38 secured by screws to the bottom of the truck. The screw 36 is then riveted, as shown at 40, to said valve box. Said valve is provided with handles 49 by which it may be turned, and is also formed in its lower surface with a recess in which is a gasket 41 of leather or suitable material to make a tight joint with said flange 33. Said valve box is connected with pipes 43 and with a pipe 44 leading longitudinally along the center of the truck and connected with pipes 45 shown in dotted lines in Fig. 12, which pipes 43 and 45 lead to valve closer casings 46. When the valve is screwed down tight on to the flange communication is open between the pipe 31 and said valve closer casings 46, but when said valve is screwed upwardly, its upper end contacts with a valve seat 47 of rubber or any suitable material, and communication with said valve closer casings is cut off. Said valve closer casings are more particularly shown in Fig. 6. Said valve closer casings are supported from the bottom of the truck by brackets 48 and arranged to register with the valves in the bottom of the box near one end thereof. They are provided in their upper sides with rubber rings 50, which fit tightly against the bottoms of the boxes around the valve openings. Through said valve closer casings extend longitudinal rock shafts 51, to which are secured arms 52 upon the outer ends of which are pivotally secured valve closers 53 adapted to press the paper valves to their seats. Secured to the separating shelves are valve closer casings 55, which are similar to the valve closer casings 46, except that they have rubber rings 56 in their lower surfaces as well as in their upper. Said rubber rings are compressed just sufficiently to make an air-tight joint with the sides of the boxes but not unduly crush said rubber. They are arranged so as to register with valves at the other end of the box from the valve closer casings 46. The rock shafts 20 extend longitudinally through said valve closer casings 55, and to said rock shafts are secured arms 58 to the free ends of which are pivotally supported upper and lower valve closures 59, 60, the lower valve closers being adapted to close the upper valves of the lower boxes, and the upper valve closers being adapted to close the lower valves of the upper boxes. Pivoted upon the upper longitudinal rod 14 are arms 61 extending in pairs extending in opposite directions from said rod and by the free ends of said arms are carried longitudinal rock shafts 62 which in turn carry upper valve closers 63, arranged to register with the upper valves of the upper boxes. All of said valve closers 53, 59, 60, and 63 are adapted to be moved to and from the corresponding valve openings by means of a handle 65 on a shaft 66 extending longitudinally in a lateral extension 67 of the vacuum chamber to the outside of said extension, and being there connected to said handle, said shaft having an arm 68. The upper end of said arm is adapted to be pivotally connected to an end of a link 70, which is connected to an arm 71 upon the longitudinal rock shaft 51 on the near side of the truck. Said link is also connected to a link 73 which is connected to a link 74 upon the end of an arm 75 upon the rock shaft 51 upon the far side of the truck. By this means the lower rock shafts 51 are rocked, so as to move the corresponding valve closers alternately to and from the valve openings. It is in the upward movement of said valve closers that the valves are pressed to the valve seats, they having been previously supplied with a slow setting cement. Said links 73, 74, are also connected to an arm of a bell crank lever 77 pivoted upon the standard 13, another arm of said bell crank lever being connected by an adjustable link 78 to a link 79 which is connected to bell crank levers 81, 82, pivoted at 84, 85, upon said standard 13, said levers 81, 82, being also connected by links 86, 87, 88, 89, with the rock shafts 20, 62, respectively, whereby said rock shafts 20 are likewise rocked to move the valve closers 59, 60, and 63, to and from their respective valve seats.

In experiments extending for a long period of time for the purpose of preserving fruit and other perishable objects by surrounding the same with nitrogen, in air tight cases, it is found that, unless the fruit is maintained at a temperature of about 40° F. considerable moisture is given off in the form of vapor. This moisture condenses at the top of the case and drips down upon the fruit, spotting the same, so that it is not properly preserved in the case. Since the boxes, being made of a material which will exclude oxygen, are also non-conducting, that is, prevent the ready access of a cooling medium, and since the contents of the boxes occupy a large proportion of their whole interior, the operation of cooling the whole of the interior of the boxes, when the boxes are finally sealed, is so slow as to be impracticable. They can, however, be very readily reduced to a low temperature if the cooling is done before the boxes are finally closed, and I therefore find it an essential step in my process to circulate cooling medium through the boxes, rapidly reducing the heat therein, and supplying a fresh current of cooling medium, before they are finally closed.

The truck 12, with the boxes 1 loaded thereon, having been moved into the cooling chamber, and, the coupling 34 being connected with the flanged pipe 31, the door is closed. By an exhaust fan 89 the air is then exhausted out of the cooling chamber by a pipe 90 leading from its top near the end remote from the coupling and is passed into a refrigerating chamber 91 having refrigerating coils 92. Thence cold air is passed by a pipe 94 into a vessel or chamber 95 containing a sterilizing agent. Thence it is passed by a pipe 96 through a chamber 97 having a drying agent. It is then passed by the pipe 31 to the coupling 34, whence it passes by the valve closer casings 46 through the boxes of the lower tier to the other ends of said boxes. From the tops of the boxes it is then passed through the closer casings 55 to the upper boxes and passes through said boxes to the upper portions and out at the top thereof, and into the cooling chamber, and from thence it passes in the same circuit as before described. This cooling process having been continued for about an hour, the contents of all the boxes are brought to a low temperature. Then by means of a pump 100 sulfurous anhydrid or other disinfectant gas is led by a pipe 101 and a pipe 102 to the pipe 31, a valve 103 in said pipe 31 being then closed. After a sufficient amount of said disinfectant gas has been charged into the boxes, the disinfectant gas is then drawn out by the same pump, valves 104 and 105 being closed and a valve 106 being opened. The doors of the cooling chamber and the front door of the vacuum chamber are then opened, and the truck is moved into the vacuum chamber and the door of the vacuum chamber is then closed. This chamber is provided with a pipe 107 having a similar valve connection to that in the cooling chamber, so that the truck and the boxes thereon can be connected with said pipe 107. The pipe 107 is connected with a branch pipe 108 leading, as shown in dotted lines in Fig. 2, to the lower portion of the chamber and having a valve 109 therein. It is also connected with two pipes 110, 111, leading, respectively, to a vacuum chamber, and a nitrogen supply chamber, and having valves 112, 113, therein, so that either pipe may be connected exclusively with the pipe 107. The vacuum chamber with a truck therein having been tightly closed and the pipe 107 being connected with the coupling in the truck, the pipe 107 is connected to the pipe 110, and the pipe 111 is disconnected therefrom, the valve 113 being closed. The connection with a vacuum chamber is continued for a sufficient length of time to produce an almost perfect vacuum, of at least 30 inches. When this has been accomplished the pipe 110 is shut off and the pipe 108 leading to the body of the chamber is also shut off. The valve 113 is then opened allowing the supply of nitrogen or other preserving gas to flow. For the sake of brevity I shall hereinafter speak of said gas as being nitrogen. The nitrogen from the nitrogen supply chamber immediately flows by the pipe 111 and the pipe 107 and the coupling 34 through all the boxes on the truck, filling said boxes with nitrogen by displacement. It will be observed that, the chamber being under a high degree of vacuum, and it being necessary that all the nitrogen should pass through the boxes before it can reach the chamber, there is a very rapid flow of the nitrogen through the boxes into said chamber. Consequently any rarified gases that may remain in the boxes will be easily displaced by the nitrogen. The vacuum supply chamber is under a pressure higher than atmospheric pressure. It is therefore possible for the boxes to be filled with nitrogen likewise at a pressure greater than atmospheric pressure. As soon as the gage in the vacuum box indicates that a higher pressure has been obtained therein than atmospheric pressure the valve 113 is closed, and then by means of the handle 65 the longitudinal shafts are rocked, so that the valve closers press the valves on to their seats and the valves are closed. The rear door of the vacuum box is then opened, and the truck is wheeled to a delivery or finishing bench, where the covers are applied to said valves and the slats nailed on the boxes. The boxes are then ready for shipment.

I claim:—

1. The process of preserving perishable articles which comprises inclosing said articles in a receptacle adapted to be rendered air tight, passing a cooling medium through said receptacle filled with said articles, connecting said receptacle with a vacuum chamber to produce a vacuum therein, connecting said receptacle with a supply of preserving gas to fill said receptacle with said gas, and sealing said receptacle against the passage of air thereinto, substantially as described.

2. The process of preserving perishable articles which comprises inclosing said articles in a receptacle adapted to be rendered air tight, passing a cooling medium through said receptacle filled with said articles, introducing a disinfectant gas into said receptacle, connecting said receptacle with a vacuum chamber to produce a vacuum therein, connecting said receptacle with a supply of preserving gas to fill said receptacle with said gas, and sealing said receptacle against the passage of air thereinto.

In testimony whereof I have hereunto set my hand in the presence of two subscribing witnesses.

CHARLES BLAGBURN.

Witnesses:
FRANCIS M. WRIGHT,
D. B. RICHARDS.